United States Patent [19]

Hultman et al.

[11] 4,115,605

[45] Sep. 19, 1978

[54] ANTI-STATIC COMPOSITIONS COMPRISING A COPOLYMER OR PERFLUOROALKYL ACRYLATE AND POLYOXYALKYLENE ACRYLATE, WETTING AGENT, AND A SALT SELECTED FROM THE GROUP CONSISTING OF POTASSIUM ACETATE AND LITHIUM CHLORIDE IN AQUEOUS MEDIUM

[75] Inventors: David P. Hultman, Neenah; Jack L. Bergsbaken, Appleton, both of Wis.

[73] Assignee: Kimberly-Clark Corporation, Neenah, Wis.

[21] Appl. No.: 767,559

[22] Filed: Feb. 10, 1977

Related U.S. Application Data

[63] Continuation-in-part of Ser. No. 601,725, Aug. 4, 1975, abandoned.

[51] Int. Cl.$^2$ .................. B05D 1/28; B05D 3/02; B05D 3/04
[52] U.S. Cl. .................. 427/377; 260/29.6 F; 260/29.6 AB; 427/390 B; 427/390 E; 427/428
[58] Field of Search .............. 427/390 B, 377, 390 E, 427/428; 260/29.6 F, 29.6 AB

[56] References Cited

U.S. PATENT DOCUMENTS

| | | | |
|---|---|---|---|
| 2,717,842 | 9/1955 | Vitalis | 427/390 X |
| 3,061,473 | 10/1962 | Tesoro | 427/390 X |

OTHER PUBLICATIONS

Encyclopedia of Chemical Technology, vol. 2, pp. 656–657, Kirk–Othmer.

*Primary Examiner*—Michael R. Lusignan
*Attorney, Agent, or Firm*—Leydig, Voit, Osann, Mayer & Holt, Ltd.

[57] ABSTRACT

A composition useful for imparting anti-static characteristics and alcohol repellency to a hydrophobic substrate while maintaining water repellency comprising, in an aqueous medium, a salt choosen from the group consisting of potassium acetate and lithium chloride, an essentially linear copolymer of perfluoroalkyl acrylate and polyoxyalkylene acrylate, and a small amount of a non-ionic, permanent wetting agent.

9 Claims, No Drawings

ANTI-STATIC COMPOSITIONS COMPRISING A COPOLYMER OR PERFLUOROALKYL ACRYLATE AND POLYOXYALKYLENE ACRYLATE, WETTING AGENT, AND A SALT SELECTED FROM THE GROUP CONSISTING OF POTASSIUM ACETATE AND LITHIUM CHLORIDE IN AQUEOUS MEDIUM

This application is a continuation-in-part of our copending application Ser. No. 601,725 filed Aug. 4, 1975 now abandoned.

The present invention relates to compositions for imparting anti-static characteristics to hydrophobic substrates and, more particularly, to compositions useful for imparting anti-static characteristics to materials which are to be utilized in hospital operating room procedures, while maintaining water repellency.

U.S. patent application Ser. No. 729,356 filed Oct. 4, 1976, now U.S. Pat. No. 4,041,203, a continuation-in-part of Ser. No. 460,363, filed Apr. 12, 1974, now abandoned, discloses a new type of laminate which includes, as one constituent, an integrated mat of generally discontinuous, thermoplastic microfibers and, as another constituent, a web of substantially continuous and randomly deposited, molecularly oriented filaments of a thermoplastic polymer. In general, the microfibers contained in the mat have an average fiber diameter of up to about 10 microns while, in contrast, the filaments in the continuous filament web generally have an average diameter in excess of about 12 microns. The preparation of useful mats is described in the patent and other literature, U.S. Pat. No. 3,715,251, and Industrial and Engineering Chemistry, Volume 48, No. 8, pp. 1342-1346, being representative. As to the web, preferred webs are described in U.S. Pat. No. 3,692,618.

As set forth in the above-identified copending application, the laminates therein disclosed, and particularly those wherein ply attachment is achieved at intermittent discrete bond regions formed by the application of heat and pressure, are particularly useful as wrapper or containment fabrics for surgical or other health care procedures. When so used the laminates generally have a basis weight of about 0.8 - 2 oz./yd.$^2$ and contain at least about 0.3 oz./yd.$^2$ of the microfiber mat and at least about 0.5 oz./yd.$^2$ of the continuous filament web. Particularly, the thermoplastic polymer utilized in the formation of both the mat and web is polypropylene.

As also recognized in the referenced pending application, when use in an operating room is anticipated, it is necessary to treat the laminate with an anti-static composition in order to reduce surface resistivity to below 1 × 10$^{11}$ ohms./square (AATCC Test Method 76 - 1972.) It is also recognized that fluid repellency with respect to water and with respect to alcohol are frequently desirable, in addition to anti-static characteristics, particularly where the laminate is to be used as a sterile wrap, where it is desired to avoid moisture transmitted contamination of the items wrapped. The referenced applications disclose laminate materials that possess good water repellency, but suggest that when anti-static compositions are applied to the laminate, it is also desirable to treat the laminate with a fluid repellent composition in order to maintain water repellency and, additionally, provide alcohol repellency. In particular, the referenced applications suggest use of 3 M's SCOTCHBAN Brand Paper Protector FC808 as a composition useful to enhance fluid repellency. It is also known that FC808 behaves, to a limited extent, as an antistatic composition. FC808 alone, however, is not an adequate antistatic treatment composition.

Since many anti-static compositions also exhibit wetting characteristics, there is the problem of obtaining the desired high level of anti-static characteristics while maintaining good water repellency. Additional problems are presented when the laminate is to be utilized in the above referenced sterile wrap application and, particularly where the wrapped items are to be sterilized using steam. In such instances, the composition utilized to achieve anti-static characteristics must not adversely affect steam penetration or the sought after bacteria barrier properties. In addition, the composition itself must not be adversely affected, insofar as its antistatic characteristics, by the sterilization conditions used which, with respect to steam, are generally temperatures of about 250° F. – 280° F. Where a non-polar polymer, such as polypropylene, is employed in fashioning the base laminate, difficulty has been experienced in achieving a totally adequate treatment composition.

However, in accordance with the present invention there is provided a treatment composition which can be successfully used for imparting anti-static characteristics to those laminates as above discussed, and which permits maintenance of good water repellency.

The composition of the present invention comprises, in an aqueous medium, a salt selected from the group consisting of potassium acetate and lithium chloride, an essentially linear copolymer of perfluoroalkyl acrylate and polyoxyalkylene acrylate such as that contained in FC808, and a small amount of a nonionic permanent, i.e. non-volatile, wetting agent. In addition, the composition preferably includes a temporary wetting agent such as a low molecular weight alcohol, e.g. less than about seven, and preferably less than five, carbon atoms in order to permit facile application of the treatment composition to the laminate, and a small amount of an antifoaming agent so as to diminish foaming. An illustrative example of the temporary wetting agent is isopropanol, a relatively volatile mnohydric alcohol.

In formulating the treatment composition of the present invention, the salt and the essentially linear copolymer are desirably present in about equal amounts by weight so that the treated laminate contains these ingredients in about equal amounts. However, some variation can be tolerated with it being understood that as salt content increases relative to copolymer content, fluid repellency tends to be diminished; the antistatic characteristics being lessened as the salt content decreases relative to the copolymer. Generally, the weight ratio of the salt to the copolymer should be in the range of about 0.5:1 to about 1.5:1.

As to the permanent wetting agent, this ingredient is used to impart film forming characteristics to the salt. Ethoxylated fatty alcohol type wetting agents have been found to be particularly useful for this purpose and, in this respect, it has been found that in order to achieve the desired film forming effect only a very small amount (e.g. less than about 5% based on the weight of the salt) need be employed. In turn, at these levels, the wetting agent does not adversely affect the desired fluid repellency.

Turning in more detail to the linear copolymer, the use of copolymers containing a maleic acid component with a fluorinated alkyl group to impart anti-static characteristics is described in U.S. Pat. No. 3,753,716. As stated therein, the copolymer used preferably has a molecular weight in the range of about 5,000 to 500,000 so that it has a film-forming ability. The essentially linear copolymer used in the present invention should have a similar molecular weight in order to be film-forming. A particularly important characteristic of the essentially linear copolymer utilized herein is that it be present, in the treatment composition, as a stable emulsion. To that extent, the identified copolymer of perfluoroalkyl acrylate and polyoxyalkylene acrylate is considered to be highly desirable since it is stable, in emulsion form, even in the presence of the salts which, as is recognized, generally have the tendency to break emulsion. FC808 contains approximately 20% by weight of such a copolymer.

Further in keeping with the preferred aspects of the present invention, a temporary wetting agent such as the indicated low molecular weight alcohol is preferably included in the treatment composition so as to insure initial wetting of the hydrophobic substrate. Based on water, alcohol in an amount of about 20 to 50 parts by weight is useful. Potassium acetate, and lithium chloride, as opposed to many other antistatic materials, are quite soluble in water and alcohol mixtures, thus permitting the use of the alcohol with the accompanying indicated advantage.

As to the amount of water contained in the treatment composition, this depends to a large extent on the manner in which the composition is to be applied to the laminate. In general, the amount of dry "add-on" of the combined salt and linear copolymer to the substrate should be at least about 0.1% and generally about 0.4% to about 0.8%, based on the weight of the laminate. If a printing application technique is used to achieve such "add-ons", then concentrated treatment solutions can be emloyed, e.g., about 5 to 15 parts of liquid per part of combined salt and copolymer. A particularly advantageous aspect of the present composition is that it can be formulated in a concentrated form thereby permitting application by roll printing. This permits very high speed application and obviates the necessity for removing a large amount of liquid during drying, the latter necessitating a significantly more expensive treatment procedure than one wherein only small quantities of liquid need be removed.

The following Examples illustrate various embodiments of the present invention:

EXAMPLE I

A treatment solution for application by the print technique was prepared in accordance with the following formulation:

| | |
|---|---|
| Water | 6 gallons |
| Isopropanol | 2.5 gallons |
| Potassium acetate | 4 pounds |
| Linear copolymer (3M's SCOTCHBAN Brand Paper Protector FC-808- a weakly cationic aqueous latex containing approximately 20% by weight of an essentially linear copolymer of perfluoroalkyl acrylate and polyoxyalkylene acrylate) | 2.23 gallons |
| Anti-foaming agent (Dow's Medical anti-foam-C) | 240 ml |
| Non-ionic polyoxyethylene wetting agent (ICI's Synthrapol KB, an ethoxylated fatty alcohol) | 45 ml. |

Print application of the foregoing treatment solution to a laminate as described in the above-identified copending application can be accomplished at a speed of at least 500 feet per minute by passing the laminates between rubber rolls which have had the composition applied to their surface by means of "Anilox" steel applicator rolls. The laminate is then dried by treatment with hot air at about 300° F. The dry add-on of potassium acetate and the copolymer, based on the laminate weight, is about 0.3% with respect to each. The treated laminate has desirable water repellency and a resistivity of about $5 \times 10^9$ ohms./square.

A dip and squeeze technique is an alternate application approach. In this approach a very dilute treatment solution should be employed, being on the order of about at least 200 parts of liquid per combined amount of salt and copolymer.

EXAMPLE II

A bath was prepared in accordance with the following formulation:

| | |
|---|---|
| Water | balance |
| Isopropanol | 20% by weight |
| Potassium acetate | .168% by weight |
| Linear copolymer (3M's SCOTCHBAN Brand Paper Protector FC-808-a weakly cationic aqueous latex containing approximately 20% by weight of an essentially linear copolymer of perfluoroalkyl acrylate and polyoxyalkylene acrylate) | .172% by weight |
| Anti-foaming agent (Dow's Medical anti-foam-C) | .018% by weight |
| Non-ionic polyxyethylene wetting agent (ICI's Synthrapol KB, an ethoxylated fatty alcohol) | .0068% by weight |

A dip and squeeze technique was employed to treat a laminate as described in the above identified copending application with the foregoing bath. The treated laminate was dried on a hot surface at about 212° F, and then cured at about 240° F for three minutes. The cured laminate had desirable water and alcohol repellency and a resistivity of about $8.4 \times 10^9$ ohms/square.

EXAMPLE III

Using the same formulation as that in Example II, with the exception that the potassium acetate was replaced by a like amount of lithium chloride, a bath was prepared, and a laminate as described in the above identified application was treated employing the dip and squeeze technique. The treated laminate was dried on a hot surface at about 212° F, and then cured at about 240° F for three minutes. The cured laminate had desirable water and alcohol repellency, but the alcohol repellency was not so great as that obtained in Example II. The cured laminate had a resistivity of $5.9 \times 10^7$ ohms/square.

As disclosed in Examples II and III, the treatment composition of the present invention may be utilized to impart alcohol repellency to treated laminates. In order to obtain alcohol repellency, it is necessary to cure the treated and dried laminate by exposing it to heat. It will be understood that the temperature and period of exposure are not critical in the cure step. A cure temperature of 240° F for three minutes has been found desirable, but either or both of these parameters may be varied. For instance, a cure at 240° F for one minue can impart significant alcohol repellency.

The heat cure step imparts a degree of alcohol repellency to treated laminates whether the print technique or the dip and squeeze technique is used. The degree of alcohol repellency obtained with the print technique, however, is significantly less than that obtained with the dip and squeeze technique. It is believed that the complete saturation of the laminate which is achieved by the dip and squeeze technique, but not by the print technique, is responsible for the difference in observed degrees of alcohol repellency.

We claim:

1. A composition useful for imparting antistatic characteristics to a hydrophobic substrate while maintaining water repellency comprising, in an aqueous medium, a salt selected from the group consisting of potassium acetate and lithium chloride, an essentially linear copolymer of perfluoroalkyl acrylate and polyoxyalkylene acrylate, and a small amount of a nonionic, permanent wetting agent, the weight ratio of said salt to said copolymer being at least about 0.5 to 1.

2. The composition of claim 1 further containing low molecular weight monohydric alcohol.

3. The composition of claim 2 further containing an antifoam agent.

4. The method of treating a hydrophobic substrate whereby, in addition to imparting antistatic characteristics and maintaining water repellency, alcohol repellency is imparted to the substrate, which comprises application of the composition of claim 1 to substantially saturate the substrate, then drying and curing the substrate by exposing it to heat.

5. A composition in accordance with claim 1 wherein the weight ratio of said salt to said copolymer is less than about 1.5 to 1.

6. A composition useful for imparting antistatic characteristics to a hydrophobic substrate while maintaining water repellency comprising, in an aqueous medium:
an essentially linear copolymer of perfluoroalkyl acrylate and polyoxyalkylene acrylate;
a salt selected from the group consisting of potassium acetate and lithium chloride, in an amount enabling said composition to impart a high level of antistatic characteristics to said substrate; and
a small amount of a nonionic, permanent wetting agent.

7. The composition of claim 6 further containing low molecular weight monohydric alcohol.

8. The composition of claim 7 further containing an antifoam agent.

9. A method of treating a hydrophobic substrate whereby, in addition to imparting antistatic characteristics and maintaining water repellency, alcohol repellency is imparted to the substrate, which comprises application of the composition of claim 6 to substantially saturate the substrate, then drying and curing the substrate by exposing it to heat.

* * * * *

UNITED STATES PATENT OFFICE
CERTIFICATE OF CORRECTION

Patent No. 4,115,605　　　　　　　　Dated September 19, 1978

Inventor(s) David P. Hultman, Jack L. Bergsbaken

It is certified that error appears in the above-identified patent and that said Letters Patent are hereby corrected as shown below:

Abstract, line 4, change "choosen" to --chosen--,

Column 1, lines 45 and 46, change "Particularly" to --Preferably--,

Column 2, line 40, change "mnohydric" to --monohydric--.

Signed and Sealed this

Twenty-eighth Day of November 1978

[SEAL]

Attest:

RUTH C. MASON
Attesting Officer

DONALD W. BANNER
Commissioner of Patents and Trademarks